June 10, 1958 W. E. HAPPEL 2,837,875
LOCATING DEVICE FOR MACHINE TOOLS
Filed Sept. 28, 1956
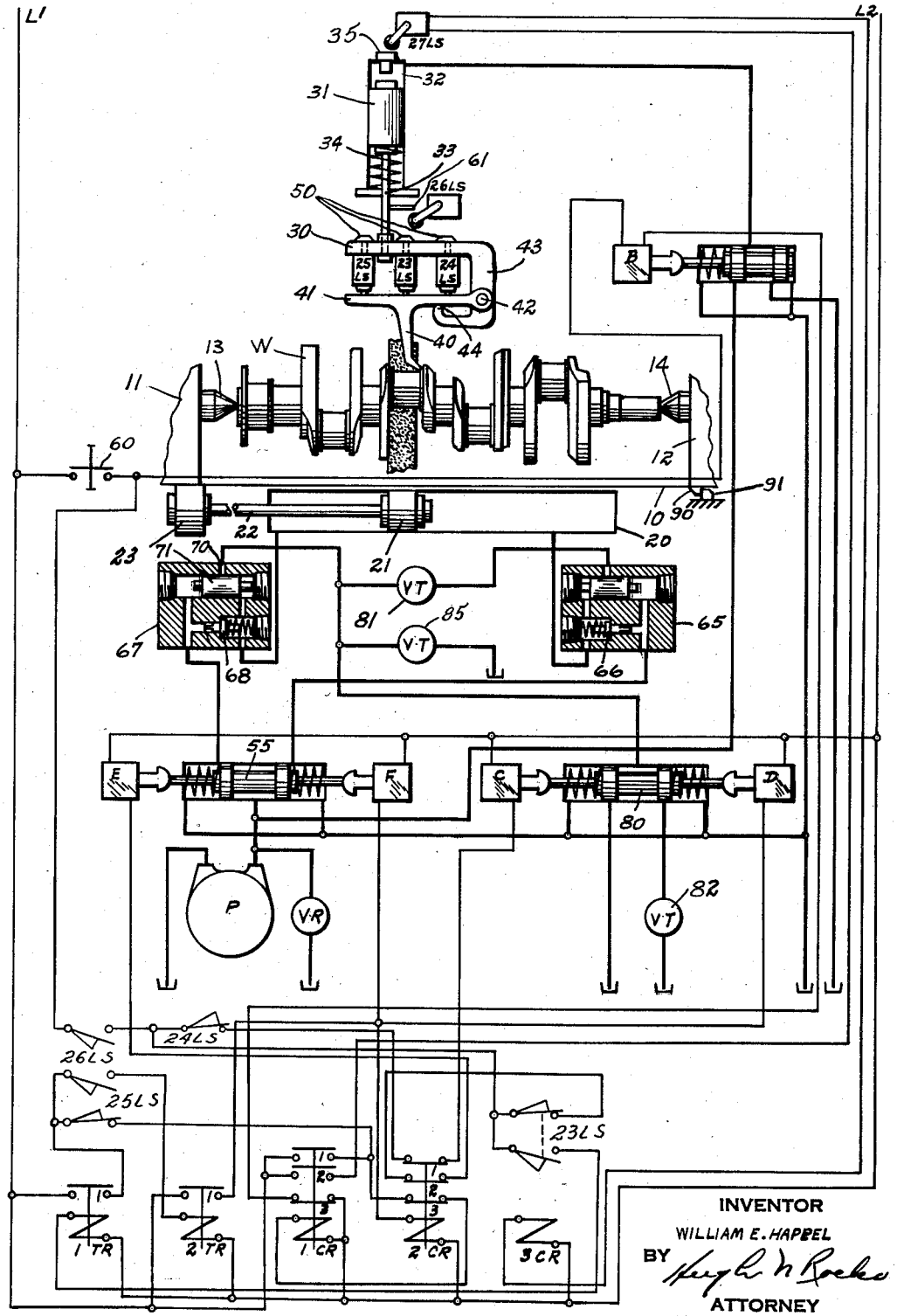
INVENTOR
WILLIAM E. HAPPEL
BY
ATTORNEY

United States Patent Office 2,837,875
Patented June 10, 1958

2,837,875

LOCATING DEVICE FOR MACHINE TOOLS

William E. Happel, Waynesboro, Pa., assignor to Landis Tool Company, Waynesboro, Pa.

Application September 28, 1956, Serial No. 612,673

4 Claims. (Cl. 51—105)

This invention relates to locating devices for grinding and other machines for machining workpieces having axially spaced shoulder portions.

In machining workpieces of this nature, it is necessary that the cutting tool, in this case a grinding wheel, be in exact alignment with said shoulder portions.

It is therefore an object of this invention to provide means for effecting a relative axial movement at controlled rates between the work and the cutting tool.

Another object is to provide means for correcting for over-travel between the cutting tool and the work during the locating cycle.

The drawing is a hydraulic and electric diagram.

Numeral 10 indicates the work carriage of a crank grinding machine. Numerals 11 and 12 indicate a headstock and a footstock respectively on said work carriage 10. A headstock center 13 and a footstock center 14 serve to rotatably support a workpiece W.

The work carriage 10 may be moved longitudinally by means of a hydraulic motor consisting of a cylinder 20 and a piston 21 in said cylinder 20. A piston rod 22 on said piston 21 is attached to a bracket 23 on said work carriage 10.

The means for locating the workpiece W axially relative to the grinding wheel consists of a bracket 30 movable vertically into and out of operative position by means of a piston 31 slidably mounted in a cylinder 32 and connected to said bracket 30 by means of piston rod 33. A spring 34 urges said piston 31 upwardly to move bracket 30 and associated parts to inoperative position. The means for engaging the work consists of a finger portion 40 on a horizontal member 41 pivoted at 42 on a depending portion 43 of bracket 30. Downward movement of said horizontal member 41 is limited by an upwardly directed member 44 on said depending portion 43. A series of limit switches 23LS, 24LS, and 25LS are adjustably suspended from the upper portion of bracket 30 in the path of pivoted horizontal member 41. Adjusting screws 50 each having suitable graduation are provided for adjusting the positions of said limit switches relative to said horizontal member 41.

*Operation*

In the following description of the operation of this invention, the abbreviation LS means limit switch. The abbreviation CR means control relay. The abbreviation TR means timing relay. The number preceding the abbreviation distinguishes it from other similar devices. The number following the abbreviation identifies the contacts in the relay or limit switch referred to. The abbreviation NC preceding any of the above mentioned abbreviations means normally closed. If the abbreviation NC does not appear before any abbreviations mentioned above, it may be assumed that the contact in question is open.

The locating cycle is started by closing the start switch 60 to complete a circuit from L1 through solenoid B and NC–1CR3 to energize locator valve solenoid B. Said valve is moved to the left to direct fluid under pressure from pump P to the upper end of cylinder 32 to move piston 31 downwardly against spring 34 to place the finger portion 40 in position to be engaged by a shoulder on workpiece W. In response to this movement, an arm 61 on piston rod 33 engages and closes 26LS to complete a circuit from L1 through switch 60, NC–24LS1 and NC–2CR1 to energize valve solenoid C. At the same time, a circuit is completed through NC–23LS1 and NC–2CR2 to energize traverse reverse valve solenoid E. Reverse valve 55 is shifted to the right to direct fluid under pressure through bleeder valve 65 which directs fluid under pressure through a check valve 66 to the right end of cylinder 20 to move work W to the left. At the same time, exhaust fluid from the other side of the cylinder passes through a bleeder valve 67 having a check valve 68 which prevents the passage of exhaust fluid to said traverse reverse valve and directs it through a port 70 which is closed by shuttle valve 71 when pump pressure is applied to the left side of said shuttle valve 71 and opened when exhaust pressure is applied to the other side.

When piston 21 is moving to the right, valve solenoid C, which has been energized, shifts the traverse rate control valve 80 to the right. Exhaust fluid discharged from bleeder valve 66 passes through a throttle valve 81 after which fluid passes through selector valve 80 and throttle valve 82 which determines the speed at which the carriage moves for a wheel dressing operation. Before the work reaches locate position, the work moving to the left engages feeler 40 and shifts arm 41 to position to open NC–24LS. Opening 24LS deenergizes valve solenoid C and allows rate control valve 80 to move to central position to block the passage of exhaust fluid from the left end of cylinder 20. Said fluid must then be discharged through throttle valve 85 which is set to provide a suitable traverse speed at which to approach locate position.

As the carriage moves to the left, the locator finger 40 closes the locator switch 23LS2 and opens 23LS1. Opening 23LS1 deenergizes valve solenoid E permitting the reversing valve to return to central position. In this position, it prevents fluid under pressure from passing to either side of the traverse motor. Closing 23LS2 completes a circuit to 1TR which closes after a predetermined interval. The purpose of the delay is to allow time for possible over-travel of the work to occur. If there is no over-travel by the end of the timed period, 1TR1 closes completing a circuit through 25LS2 and NC–2CR3 to energize 1CR.

NC–1CR3 opens to deenergize valve solenoid B to connect the upper end of the locator cylinder to exhaust and thus permit the locator be withdrawn by the spring.

1CR2 completes a circuit through 27LS which is closed by pin 35 in response to the upward movement of the locator piston 31 to energize 3CR. 3CR signals through any suitable device for the machine cycle to proceed.

If, for any reason, the carriage over-travels and carries the workpiece past the locate point, the finger 40 will close 25LS to complete a circuit to 2TR after an interval determined by the setting of 1TR which has a contact 1TR1 in the 2TR circuit. When 2TR is energized, it closes to open after a timed interval. Closing 2TR1 completes a circuit to energize valve solenoid F which shifts the traverse reversing valve 55 to the left to direct fluid under pressure for a traverse movement to the right. The timed interval provided by 2TR is sufficient to permit the completion of the traverse reset movement. At the same time, valve solenoid D is energized to shift the traverse rate selector valve to the left to provide a free passage of exhaust fluid and therefore, a rapid traverse movement for resetting the carriage.

Also, at the same time, 2CR is energized and NC–2CR1, NC–2CR2, and NC–2CR3 open to deenergized valve solenoids C and E and 1CR. Deenergizing valve solenoid C returns the traverse rate valve 80 to center position and slows down the traverse of the workpiece in a position out of alignment to the right of the grinding wheel determined by dog 90 on carriage 10 engaging a stop 91 which may be mounted on a machine bed. Deenergizing 1CR opens 1CR2 which deenergizes 3CR and thus prevents continuation of the cycle until the work is properly located.

I claim:

1. In a metal working machine, a tool support movable toward and from a workpiece and having a cutting tool mounted thereon, a work support, means for rotatably supporting a workpiece thereon, means for relatively locating the work and tool axially including a gauge movable toward and from working position and having means for co-acting with a locating surface on said workpiece, means for causing a relative longitudinal movement between said tool and said work, mechanism actuated by said locator when said tool and said work reach a predetermined position for stopping said longitudinal movement, including control means for effecting said longitudinal movement in opposite directions or for stopping said longitudinal movement, and means on said gauge operable in the event said longitudinal moving means fails to stop in said predetermined position to actuate said control means to reverse said longitudinal moving means and return said workpiece and tool to their original relative position in order to repeat said locating operation.

2. In a metal working machine, a tool support movable toward and from a workpiece and having a cutting tool mounted thereon, a work support, means for rotatably supporting a workpiece thereon, means for relatively locating the work and tool axially including a gauge movable toward and from working position and having means for co-acting with a locating surface on said workpiece, means for causing a relative longitudinal movement between said tool and said work, mechanism actuated by said gauge when said tool and said work reach a predetermined position for stopping said longitudinal movement, including control means for effecting said longitudinal movement in opposite directions or for stopping said longitudinal movement, control means for determining the speed of said longitudinal movement, and means on said gauge operable in the event said longitudinal moving means fails to stop in said predetermined position to actuate said control means to reverse said longitudinal moving means and to change said speed control means to fast position to return said workpiece and tool to their original relative position in order to repeat said locating operation.

3. In a metal working machine, a tool support movable toward and from a workpiece and having a cutting tool mounted thereon, a work support, means for rotatably supporting a workpiece thereon, means for relatively locating the work and tool axially including a gauge movable toward and from working position and having means for co-acting with a locating surface on said workpiece, means for causing a relative longitudinal movement between said tool and said work, mechanism actuated by said gauge when said tool and said work reach a predetermined position for stopping said longitudinal movement, including control means for effecting said longitudinal movement in opposite directions or for stopping said longitudinal movement, control means for determining the speed of said longitudinal movement, and means on said gauge operable in the event said longitudinal moving means fails to stop in said predetermined position to actuate said first control means to reverse said longitudinal moving means and to change said speed control means to fast position to return said workpiece and tool to their original relative position in order to repeat said locating operation.

4. In a metal working machine, a tool support movable toward and from a workpiece and having a cutting tool mounted thereon, a work support, means for rotatably supporting a workpiece thereon, means for relatively locating the work and tool axially including a gauge movable toward and from working position and having means for co-acting with a locating surface on said workpiece, means for causing a relative longitudinal movement between said tool and said work including a piston and cylinder, a selector valve for determining the rate of flow of exhaust from said cylinder, a plurality of throttle valves each set for a different rate of flow, conduits between said selector valve and said throttle valves, and means actuated by said gauge for actuating said selector valve to direct exhaust fluid through one of said throttle valves which is set to cause the traverse movement to be reduced to a slow rate for approaching a position at which the work is to be located for grinding.

References Cited in the file of this patent

UNITED STATES PATENTS

| | | |
|---|---|---|
| 2,559,431 | Hollengreen | July 3, 1951 |
| 2,639,562 | Balsiger | May 26, 1953 |

FOREIGN PATENTS

| | | |
|---|---|---|
| 709,158 | Great Britain | May 19, 1954 |